United States Patent
Kang

(10) Patent No.: US 11,451,412 B2
(45) Date of Patent: Sep. 20, 2022

(54) METHOD FOR ENABLING NODES OF HETEROGENEOUS COMMUNICATION PROTOCOLS TO SHARE A SINGLE BUS BY ADAPTING TO ONE OF THE HETEROGENEOUS COMMUNICATION PROTOCOLS AND DEVICE FOR SAID METHOD

(71) Applicant: VSI CORPORATION, Seoul (KR)

(72) Inventor: Su Won Kang, Seoul (KR)

(73) Assignee: VSI CORPORATION, Seoul (KR)

(*) Notice: Subject to any disclaimer, the term of this patent is extended or adjusted under 35 U.S.C. 154(b) by 436 days.

(21) Appl. No.: 16/689,660

(22) Filed: Nov. 20, 2019

(65) Prior Publication Data
US 2020/0287744 A1  Sep. 10, 2020

(30) Foreign Application Priority Data

Mar. 6, 2019 (KR) .................. 10-2019-0025746
Mar. 14, 2019 (KR) .................. 10-2019-0029536

(51) Int. Cl.
 *H04L 12/40* (2006.01)
 *G06F 13/42* (2006.01)

(52) U.S. Cl.
 CPC ........ *H04L 12/40084* (2013.01); *G06F 13/42* (2013.01); *H04L 2012/40215* (2013.01); *H04L 2012/40273* (2013.01)

(58) Field of Classification Search
 CPC ............................ H04L 12/40084; G06F 13/42
 See application file for complete search history.

(56) References Cited

U.S. PATENT DOCUMENTS

| | | | |
|---|---|---|---|
| 10,530,606 B2 * | 1/2020 | Meier | H04L 12/40143 |
| 11,146,420 B2 * | 10/2021 | Meier | G06F 13/4282 |
| 2014/0241441 A1 * | 8/2014 | Devaucelle | H04B 3/54 375/257 |
| 2018/0091329 A1 * | 3/2018 | Matsushita | H04L 12/413 |
| 2019/0020499 A1 * | 1/2019 | Meier | H04L 12/4135 |
| 2020/0374151 A1 * | 11/2020 | Meier | H04L 1/0041 |

FOREIGN PATENT DOCUMENTS

| | | |
|---|---|---|
| KR | 10-1480052 B1 | 1/2015 |
| KR | 10-2015-0050960 A | 5/2015 |
| KR | 10-1715331 B1 | 3/2017 |

* cited by examiner

*Primary Examiner* — Henry Tsai
*Assistant Examiner* — Christopher A Daley
(74) *Attorney, Agent, or Firm* — Hauptman Ham, LLP

(57) ABSTRACT

A device of the present invention incorporates a data block, received from a Communication Module (CM) connected via an interface, into a frame of a specific format in which a preamble for data synchronization is placed at a head, and transmits the frame to the bus while taking only a data block formed in compliance with an arbitrary Communication Protocol (CP) from a series of frames of the specific format that are constituted from signals detected from the bus. When transmitting data to the bus, the device inserts a code indicating the arbitrary CP into a head part of the preamble, and when a signal corresponding to the head part of the preamble detected from the bus is identified as the code indicating the arbitrary CP, it takes a frame with the identified code to transfer a data block within the taken frame to the CM through the interface.

14 Claims, 5 Drawing Sheets

METHOD FOR ENABLING NODES OF HETEROGENEOUS COMMUNICATION PROTOCOLS TO SHARE A SINGLE BUS BY ADAPTING TO ONE OF THE HETEROGENEOUS COMMUNICATION PROTOCOLS AND DEVICE FOR SAID METHOD

CROSS REFERENCE TO RELATED APPLICATION

This application claims the priority of Korean Application No. 10-2019-0025746, filed on Mar. 6, 2019, and Korean Application No. 10-2019-0029536, filed on Mar. 14, 2019. The entire disclosures of each of the above applications are incorporated herein by reference.

BACKGROUND

Field

The present invention relates to method and device for providing a communication path for nodes to communicate based on different communication protocols, more specifically, nodes of which communication protocols to be applied to transceiving data frames through a connected bus are different from each other.

Description of the Related Art

Many kinds of apparatuses that make life easier for persons have a wide variety of functions, and in case of a complex apparatus among them, especially a vehicle, its mechanism is based on a lot of information being transceived in real time between various electronic control units (ECUs). Such information exchange within a vehicle, etc. is mainly performed through a specific type of communication network, for example, CAN (Controller Area Network).

The special type of communication network, such as a CAN adopted for a vehicle and the like, is used for communication of control signals for an engine and a gearbox etc. for driving control, the driving status and diagnosis of a vehicle, and the status of safety and comfort equipment.

However, in order to improve the performance or function of a vehicle or the like, the amount of information to be communicated among components must be increased and a faster communication is required. Therefore, communication methods that satisfy such requirement are newly developed and applied to a vehicle, or an existing high-speed data communication method that has been widely used is also applied to a vehicle and the like. Such communication methods include CAN Flexible Data (CAN-FD), Local Interconnect Network (LIN), Single Edge Nibble Transmission (SENT), Ethernet and the like.

As such various communication methods become available to a vehicle, etc., manufacturers of a vehicle, etc. have partially adopted and applied a communication method that is optimal for property (for example, an amount of data generated per second, importance, urgency or the like) of data to be communicated. In this situation, components that need to communicate in different communication methods are mixed in a single vehicle.

As such, when components communicating based on mutually different communication protocols are mixed in a vehicle or the like, these components cannot be directly connected to the same communication line. That is, only components communicating based on the same communication protocol can be directly connected to the same communication line.

This means that the number of communication cables connecting the components is increased by the number of adopted communication protocols that are different from each other, compared to the case that the communication protocol which an apparatus such as a vehicle adopts for communication among components is single. Such an increase requires, of course, relatively more time and expense in securing and managing communication cables and connecting cables to the components. As a result, the cost of producing and/or manufacturing an apparatus such as a vehicle, etc. is relatively increased.

SUMMARY OF THE INVENTION

It is an object of the present invention to provide method for enabling a common bus to be used by nodes of which communication protocols to be applied to transceiving data are different from each other, and a device for said method.

It is another object of the present invention to provide a bus sharing method that supports direct connection to a commonly used bus for components of a particular communication protocol among components of which communication protocols to be applied to transceiving data are different from each other, and a device for said bus sharing method.

The scope of the present invention is not necessarily limited to the above explicit statements. Rather, the scope of the present invention covers anything to accomplish effects that could be derived from the specific and illustrative explanations of the present invention below.

A device for transmitting and receiving data to/from other devices through a shared bus in accordance with one aspect of the present invention, comprises: a transceiver configured to detect signals carried on the bus and to transmit input data after converting the input data into a signal form suitable for the bus; a first interface configured to transmit and receive to/from a Communication Module (CM) that is electrically connected to the first interface and is intended for transceiving data based on an arbitrary Communication Protocol (CP); and a controller configured to incorporate a data block, which is received from the CM through the first interface, into a frame of a specific format in which a bit block for data synchronization is placed at head, and to transmit the frame of the specific format to the bus, while it recognizes a series of frames of the specific format from signals on the bus detected by the transceiver, and then takes only a data block constituted in compliance with the arbitrary CP from the series of frames. Further, the controller is also configured to insert a code indicating the arbitrary CP into a specific part of the bit block when transmitting data to the bus, to take data of a certain frame if a signal corresponding to the specific part of a bit block, detected by the transceiver from the bus, pertaining to the certain frame is identified as the code indicating the arbitrary CP, and to deliver a data block within the taken frame to the CM through the first interface.

In one embodiment according the present invention, the controller adds an error verification field, which a bit string is filled in for checking a transmission error at receiving side, to a back end of the received data block when constituting the received data block into a frame of the specific format. In the present embodiment, a bit string to cause data in a frame to be detected as faulty may be filled in the error verification field.

In another embodiment according to the present invention, the controller adds a header including a destination address and a source address to a front end of the received data block when constituting the received data block into a frame of the specific format wherein the destination address may be a specific address that a particular type of CMs will not receive, and the particular type of CMs are intended to transmit and receive data in compliance with a CP to be observed for transmitting and receiving data through the bus. In this embodiment, the specific address is an address that cannot be or has not been assigned to the particular type of CMs and is not a special address indicating a frame for broadcast, either.

In one embodiment according to the present invention, if a special mode is set, the controller may not add the error verification field to a back end of the received data block when constituting the received data block into a frame of the specific format.

In one embodiment according to the present invention, the device may further comprise at least one second interface configured to transmit and receive to/from at least one CM that is electrically connected to said at least one second interface respectively and is intended for transceiving data based on another CP other than the arbitrary CP. In this embodiment, the controller inserts a code indicating a CP, which one interface among a plurality of interfaces consisting of the first interface is based on for transceiving data, into the specific part of the bit block placed at a front of a second frame of the specific format when incorporating a data block received from the one interface into the second frame; takes, from the bus, data of a third frame with a certain code that is confirmed to be identical to one of codes respectively indicating CPs which the plurality of interfaces are based on for transceiving data, the certain code being detected by the transceiver from a signal corresponding to the specific part of a bit block being carried on the bus; and delivers all or part of data of the taken third frame to a CM intended to transceive data based on a CP corresponding to the certain code.

In the embodiment in which a plurality of interfaces are included, an arbitrary one interface among the plurality of interfaces may be an interface configured to be connected to and communicate data with a CM that is intended to transmit and receive data in same CP as a CP to be observed for transmitting and receiving data through the bus. In this case, the controller causes a data block received from the arbitrary one interface to be a frame of the specific format as it is; and converts a data block, received from an interface other than the arbitrary one interface, to a frame of the specific format by adding an error verification field in which a bit string to cause detection of transmission error is inserted and placing the bit block at a front end of the added header. In addition, the controller makes the arbitrary one interface transmit the taken third frame, as it is, to a CM connected through the arbitrary one interface if the certain code indicates a CP which the arbitrary one interface is based on for transceiving data; and makes another interface other than the arbitrary one interface transmit a data block extracted from a data field of the taken third frame to a CM connected through the another interface if the certain code indicates a CP which the another interface is based on for transceiving data.

In one embodiment according to the present invention, if a special mode is set, the controller may establish a path that enables a CM connected to the arbitrary one interface to be directly connected to the transceiver or the bus.

In the embodiment in which a plurality of interfaces are included, the controller assigns a priority to each CP which the plurality of interfaces are respectively based on for transceiving data; selects data blocks received from the plurality of interfaces according to priorities assigned to CPs applied to the data blocks and to convert the selected data blocks into one or more frames of the specific format; and transmits each of the converted frames of the specific format to the bus through the transceiver. For example, the controller converts only data blocks, which a highest priority CP is applied, among the received data blocks into a frame of the specific format, or converts data blocks among the received data blocks into a frame of the specific format in such a manner that one or more data blocks to which the highest priority CP is applied are included in a most advanced position in a frame of the specific format.

In one embodiment according to the present invention, the code indicating the arbitrary CP consists of a bit string that is different, by at least one bit, from another bit string corresponding to the specific part within a bit pattern that is defined for the bit block by a CP to be observed for transmitting and receiving data through the bus.

A method for transmitting data to other devices through a shared bus in accordance with another aspect of the present invention, comprises: a first step of receiving a data block of a series of bits from a CM that is intended for transceiving data based on an arbitrary CP; a second step of converting the received data block to a frame of a specific format in which the bit block for data synchronization is placed at a head; and a third step of transmitting the frame of the specific format to the bus, wherein the second step inserts a code allocated for the arbitrary CP, among codes respectively allocated for a plurality of CPs, into a specific part of the bit block.

A method for receiving data from other devices through a shared bus in accordance still another aspect of the present invention, comprises: a first step of detecting signals carried on the bus; a second step of checking whether, among the detected signals, a signal corresponding to a specific part of a bit block for data synchronization placed at a head of a frame of a specific format indicates a special code indicating a pre-specified CP; a step of selectively taking a frame, of which the bit block placed at a head is carrying the special code depending on whether or not the signal corresponding to the specific part is identified as the specific code; and a fourth step of transferring a data block within the taken frame to a CM that is intended for transceiving data on the basis of the pre-specified CP.

In the device, method and a variety of embodiments described embodiments, the specific part corresponds to a front part of the bit block.

In accordance with present invention described above or at least one embodiment of the present invention to be described in detail below with reference to appended drawings, a method of enabling communication components, all communication protocols for transceiving data of which are not same, to share a single bus in communication makes it possible for Communication Modules (CMs) of the same communication protocol to communicate with each other, even if CMs, i.e., communication components connected to a single bus are not all the same in the communication protocols adopted by them. Therefore, in case components of which communication protocols for transmitting and receiving data are different coexist in an apparatus such as a vehicle, etc., it is not necessary to prepare a communication line for each communication protocol owing to the present invention.

In addition, in the embodiment of the present invention, if a communication system supporting a higher speed communication than communication systems on which each CM is based is applied to a single bus being shared by CMs of different communication protocols, it is possible to connect all of the conventional CMs to a single high-speed bus without slowing down the communication speed or while providing even higher communication speed, with respect to the conventional CMs that are supposed to be connected by separate buses. As a result, wiring and assembly processes can be made simpler, and the performance of the apparatus can be further improved. This reduces the cost or time required for the manufacture or post management of an apparatus equipped with the corresponding CMs as components, and ultimately improves the market competitiveness of the apparatus.

Although the present invention is based on the premise that CMs of different communication protocols are all connected to a single bus through an adapter to enable sharing of the single bus, it also supports connecting the particular type of CMs, which communicate according to the communication protocols applied to the shared bus, directly to the bus being shared by other CMs. Therefore, the present invention has the advantage that it is possible to additionally secure the communication path between the CMs of the heterogeneous communication protocols on an existing bus in a manner compatible with the existing bus without modifying the existing bus system.

DETAILED DESCRIPTION

Figure 1:
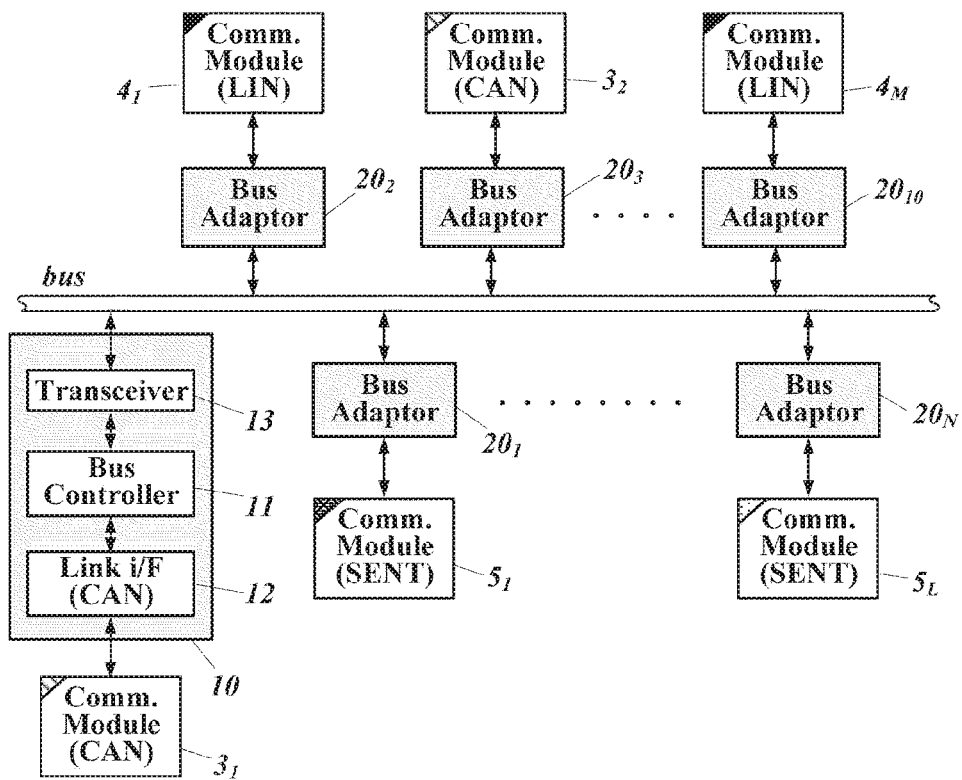
FIG. 1 illustrates a bus system in which CMs of different communication protocols are connected together through an adapter to a single bus according to an embodiment of the present invention.

In what follows, embodiments of the present invention will be described in detail with reference to appended drawings.

In the following description of the embodiments of the present invention and the accompanying drawings, the same reference numerals or symbols designate the same elements unless otherwise specified. Of course, for convenience of explanation and for the sake of understanding, the same components may be indicated by different reference numbers or symbols if necessary.

FIG. 1 illustrates a bus system in which CMs $3_i$, $4_i$, and $5_i$ (i=1, 2, . . . ) that are not all the same in communication protocol are connected indirectly to a single bus all together through a bus adapter 10 and $20_i$ (i=1, 2, . . . ) in accordance with one embodiment of the present invention. The bus adapters 10 and $20_i$ (abbreviated as 'adapter' hereinafter) are directly connected to a physical bus for transmitting and receiving data, and each of the adapters 10 and $20_i$ adapts transceiving data in compliance with at least one of various communication protocols to a communication protocol adopted for data communication on the bus. The communication protocol adopted for the bus being shared is referred to as a 'Base Communication Protocol' (BCP) hereinafter.

In one embodiment according to the present invention, the BCP, which each of the adapters 10 and $20_i$ adapts data transmission/reception to, may be one of communication protocols which are supported for adapting to the BCP by at least one of the adapters 10 and $20_i$. For example, in case the connection of the communication protocols of CAN, LIN, SENT, and bus-type Ethernet are supported by all of the adapters 10 and $20_i$, the communication protocol of bus-type Ethernet among them may be the BCP.

To be sure, one of the communication protocols that are not supported for the connection by any of the adapters 10 and $20_i$ may be adopted as the BCP. That is, in case the adapters are not configured to support the communication protocol of the bus-type Ethernet for the connection, the communication protocol of the bus-type Ethernet can be adopted as the BCP.

In the present specification, for the convenience of invention description and exemplary drawing, it is assumed that the high-speed bus-type Ethernet standard is the BCP. However, of course, the present invention does not have to be limited to the case that the BCP is the bus-type Ethernet standard. The principle and technical idea of the present invention can be sufficiently implemented as long as a block of bits having a specific bit pattern (generally called as 'preamble') for synchronization of a data frame is placed at the head of the data frame carrying data in communication among nodes on a bus. Thus, if any of the existing communication protocols or the communication protocols developed in the future require placement of a bit block for data synchronization, that is, a preamble, at the head of a data frame, it can be applied as the BCP. For this reason, technical implementation using such a communication protocol requiring placement of a preamble should be considered to be within the scope of the present invention unless the claims expressly exclude.

In accordance with the foregoing assumption, each of adapters 10 and $20_i$ directly connected to a shared bus is assigned a time slot for exclusive use of the shared bus according to the bus-type Ethernet standard. For this allocation of time slots, the adapter 10 (referred to as the 'master adapter' hereinafter) designated as a special node performs a cycle of discovering all nodes, including itself, sharing a single bus with each other. Then, it forms a data cycle on the bus that allows nodes, i.e., the adapters 10 and $20_i$, which are found in the discovery cycle, connected to the shared bus to occupy the bus exclusively in a time-division manner without conflicting with each other.

Arbitrating bus occupancy in a time-division manner, according to the bus-type Ethernet standard, is merely one premised technical matter for explaining the principles and technical idea of the present invention. Naturally, a communication method of arbitrating bus occupancy in a non-time divisional manner such as a bus arbitration system that permits transmission at any time, e.g., Carrier Sense Multiple Access/Collision Detection (CSMA/CD), or in frequency or code divisional system may be adopted and applied as the BCP to which the adapters performing the operation according to the present invention adapt data transmission/reception as long as it requires placement of the preamble for data synchronization at the head of a data frame to be transmitted when the bus is occupied by the bus arbitration system as described above. In the case of adopting such a communication method, a bus controller 11 of the adapters 10 and $20_i$ occupies the shared bus in compliance with the bus arbitration system required by the adopted communication method. In addition, if the adopted bus arbitration system is not based on the time division, the master adapter 10 may not form a data cycle for arbitration of bus occupancy on the shared bus.

The CMs $3_i$, $4_i$ and $5_i$, which are individually connected to the adapters 10 and $20_i$ connected to a single bus all together, may be communication components pertaining to a device, for example, an Electronic Control Unit (ECU) for performing a specific function in an apparatus, e.g., a vehicle equipped with the bus system of FIG. 1. And, each of the adapters may also be attached to the same device. Of course, it may be equipped in an apparatus in such a way that it is not attached to the same device and is connected thereto by separate cables.

On the other hand, for the bus occupancy of the time divisional system according to the BCP assumed as an example for the description of the present invention, the master adapter 10 forms a data cycle on the shared bus that allows each of the adapters connected to the same bus to occupy the bus exclusively in the order assigned to itself as mentioned above. To this end, the master adapter 10 comprises a bus controller 11 which forms such a data cycle on the shared bus; a link interface 12 capable of communicating data with a connected CM in compliance with a communication protocol on which the connected CM is based for data transmission and reception; and a transceiver 13 for a signal interface with a directly connected shared bus. Hereinafter, the communication protocol may be simply referred to as 'protocol'.

The transceiver 13 converts data bits into a signal of a predetermined level and transmits the converted signal to the bus in compliance with the bus-type Ethernet standard, or detects data bits from the bus in a reverse manner of the conversion. For example, it converts between each bit pair of '00', '01', '10', '11' and each signal of +3V, +1V, −1V, −3V levels, respectively.

Each of the adapters $20_i$ (i=1, 2, . . . ) (hereinafter, referred to as a 'slave adapter') which is clocked in synchronization with a data cycle formed on the shared bus by the master adapter 10 is configured to be physically identical to the master adapter 10.

The bus controller of each slave adapter $20_i$ (i=1, 2, . . . ) and the bus controller 11 of the master adapter 10 participate in a discovery cycle formed on the shared bus. When the discovery cycle is completed, each bus controller transmits data by occupying the shared bus in a time interval (In this specification, this time interval is referred to as 'data channel' or abbreviated as 'channel'.) that is allocated to itself within a data cycle formed according to the discovery result. As described above, the transceiver of each adapter converts data bits received from the bus controller in the same adapter into electrical signals required for transmission through the bus while it detects the electrical signals on the bus, converts the detected signals into data bits, and delivers the data bits to the bus controller.

And, the link interface of each slave adapter $20_i$, (i=1, 2, . . . ) is configured to meet the requirements for exchanging signals physically and transceive data frames in compliance with the communication protocol (for example, CAN, CAN-FD, LIN, SENT, Ethernet, etc.) on which the connected CM is based for data transmission and reception.

Hereinafter, under the condition that the CMs $3_i$, $4_i$, and $5_i$, whose communication protocols for data transmission and reception are not all same, are connected to the bus indirectly through an adapter, various methods of allowing the adapters 10 and $20_i$ connected to the bus directly to exchange data between CMs adopting the same protocol will be described in detail on the basis of the configuration of the master adapter 10. In this specification, CMs that communicate based on the same communication protocol are referred to as 'homogeneous CMs'. In contrast, CMs that communicates based on mutually different communication protocols are referred to as heterogeneous CMs. The following detailed description is, of course, applicable to the slave adapter as it is. That is, specific operations to be described with respect to the bus controller 11, the link interface 12, and the transceiver 13 of the master adapter 10 are performed as they are by the same component of the slave adapter. To be sure, the description about the slave adapter can also be applied to the master adapter. When the master adapter and the slave adapter do not need to be specifically identified in the explanation, these are collectively referred to as 'adapter'.

The bus controller 11 identifies beforehand what communication protocol is adopted by one CM $3_1$ connected to the master adapter 10. This identification can be made via a dip switch whose value can be variably set by a worker building a bus system as illustrated in FIG. 1 or configuring an adapter. For example, each adapter is additionally equipped with a dip switch, and if a worker sets the dip switch to a value assigned to the type of the communication protocol of the connected CM, the bus controller 11 is capable of identifying the type of communication protocol of the connected CM $3_1$ by reading the setting value of the dip switch.

In alternative way, if a code for a type of communication protocol (hereinafter, this code may be referred to as a "protocol code") which the link interface 12 interfaces with is set in a specific port of the link interface 12, the bus controller 11 is able to identify the type of the communication protocol of the connected CM $3_1$ by reading the value of the designated specific port.

In a state where the protocol code indicating the type of communication protocol of the connected CM $3_1$ is identified by the bus controller 11 in that way, if a bit stream from the CM $3_1$ connected to the master adapter 10 is received in compliance with a signaling method of the corresponding communication protocol, the link interface 12 receives the bit stream, constructs a data frame of a data block according to the corresponding protocol, and delivers the data frame to the bus controller 11. The data frame thus delivered is temporarily stored in an internal transmission buffer of the bus controller 11.

Figure 2:
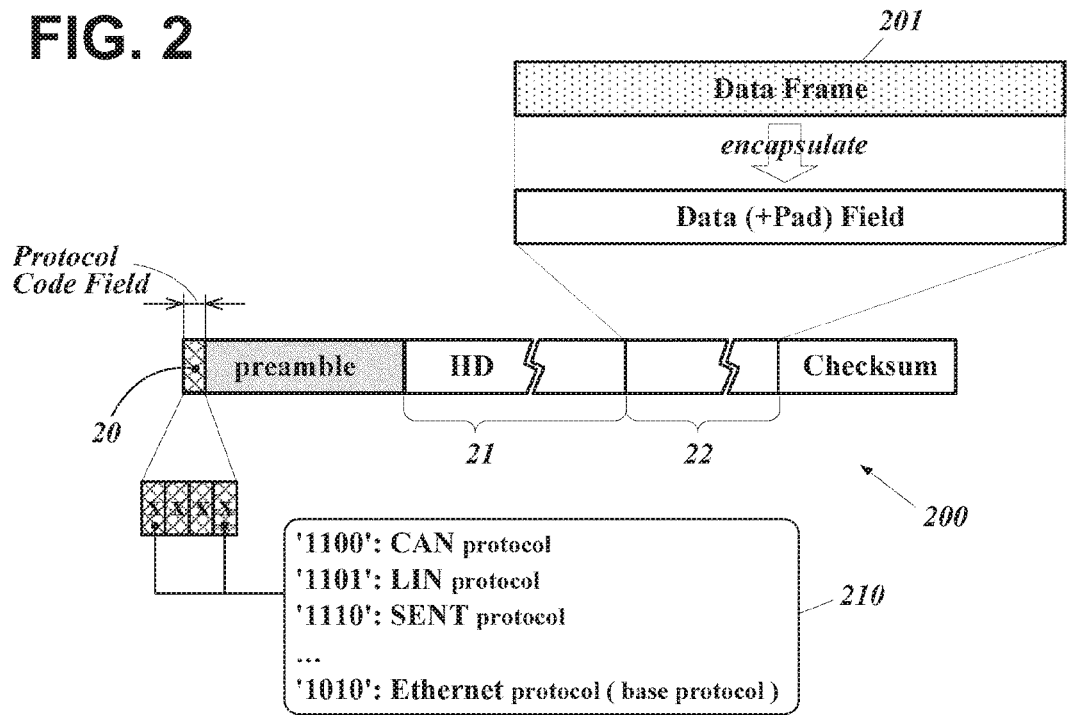
FIG. 2 illustrates a format of a transport frame configured to transmit data received from a connected CM by an adapter that enables CMs of the same communication protocol to communicate with each other through a shared bus according to an embodiment of the present invention.

The bus controller 11 converts the data frame temporarily stored in the internal transmission buffer into a data frame conforming to a format required by the adopted BCP (In this specification, the data frame configured to conform to the BCP is called a 'transport frame'.), as illustrated in FIG. 2. The conversion of the data frame illustrated in FIG. 2 is conducted because the communication protocol of the CM $3_1$ connected to the master adapter 10 is CAN and thus different from the protocol of the bus-type Ethernet standard, which is the BCP. If the communication protocol of the CM connected to the master adapter 10 is the same as the BCP, it is used as a transport frame without a frame conversion with respect to the data frame stored in the internal transmission buffer. This case will be described in more detail later.

The transport frame 200 converted by the bus controller 11 includes a preamble positioned at the head for data synchronization, a header 21 subsequent to the preamble, a data field 22 carrying data to be transported, and a checksum field that allows to check whether or not the transported data is in error. The header 21 may consist of fields for recording information on the addresses of destination and source, data length, and the like.

The bus controller 11 incorporates the received frame 201 into the data field 22 to construct one transport frame 200 as illustrated in FIG. 2, and makes the preamble of the transport frame 200 include the protocol code, which indicates the communication protocol applied to the configuration of the data frame 201 incorporated into the data field 22, that is, the CAN protocol identified beforehand, in the protocol code field 20 reserved within the preamble.

The protocol code field 20 may be reserved in any part before the start of a particular bit string or pattern indicating that the preamble is terminated, but preferably at the head of the preamble, as illustrated in the drawing.

The bus controller 11 configures the preamble of the transport frame 200 with the bit pattern defined therefor by the BCP except for the protocol code field at the head. For example, if the protocol code field is assigned 4 bits, for all 8-bytes of a preamble (inclusive of a 1-byte delimiter carrying a special bit pattern indicating the end of the preamble), 58 bits out of 60 bits except 4 bits are repeated with 1 and 0 and the last 2 bits are filled with "11". And, the protocol code field 20 is filled with a value indicating the protocol type, that is, the protocol code preceded by "11" to complete the preamble.

In another embodiment according to the present invention, a larger bit size may be allotted to the protocol code field, and as mentioned above, its position may be set somewhere other than the head in the preamble. The protocol code field is filled with a bit string that violate the requirements for the bit pattern of the preamble required by the adopted BCP. Therefore, the protocol code field can be changed in size or position only within a range in which synchronization of timing for data acquisition from the transport frame with the modified preamble is ensured when the CM communicating based on the BCP receives a transport frame with a preamble in which a protocol code is inserted.

Since the CM $3_1$ of the CAN communication protocol is connected to the master adapter 10 in the bus system illustrated in FIG. 1, the bus controller 11 fills in the protocol code field 20 of the transport frame 200 with a bit string of "1100" (210) that is a protocol code assigned to CAN. In case of the slave adapter $20_2$ to which the CM $4_1$ of LIN protocol is connected, the corresponding bus controller will fill the protocol code field with "1101".

The bus controller 11 of the master adapter 10 records the size of a data frame 201, which is carried in the data field 22 of the transport frame 200, in the corresponding field in the header 21. The destination and source address fields are either left blank or filled with null data. This is because those fields are not used by the CM intended to receive the data frame made in compliance with a communication protocol other than the BCP. The communication protocol other than the BCP is called as an Ordinary Communication Protocol (OCP), hereinafter. Finally, a checksum of a certain number of bytes (e.g., 4 bytes) is created with respect to data included from the header to the data field, and filled into the corresponding field to complete the conversion of the received data frame 201 to the transport frame.

In one embodiment according to the present invention, the checksum field, which is an error verification field, may not be added when a data frame received from a connected CM and stored in an internal transmission buffer is to be converted to a transport frame. Whether or not to include the checksum field in a transport frame may be determined by a value set in a dip switch prepared in each of the adapters 10 and $20_i$. In the present embodiment, when the dip switch is set to a value indicating 'simple mode', a transport frame including no checksum field is made in the conversion. When the dip switch is set to another value indicating 'composite mode', a transport frame including a checksum field is constructed. Here, the 'simple mode' means that all CMs are indirectly connected to the shared bus via the adapters 10 and $20_i$ and at the same time, there is no CM communicating based on the BCP in the bus system. In contrast, the 'composite mode' is set when the bus system includes the CM communicating based on the BCP connected indirectly via the adapter or directly to the shared bus. The communication among the adapters 10 and $20_i$ within the bus system that should be set to the 'composite mode' will be described later.

On the other hand, when a channel becomes available for use by the bus controller 11 within a data cycle formed on a shared bus (In case the BCP adopts the CSMA/CD bus arbitration, when no carrier is detected from the bus), the bus controller 11 sends data of a transport frame to the transceiver 13 to be transmitted into the corresponding channel if the internal transmission buffer has the transport frame that is converted and stored as described above.

These operations of conversion to a transport frame and transmission to the shared bus with respect to data frames received from the connected CM are conducted in the same manner on all other adapters.

Figure 3:
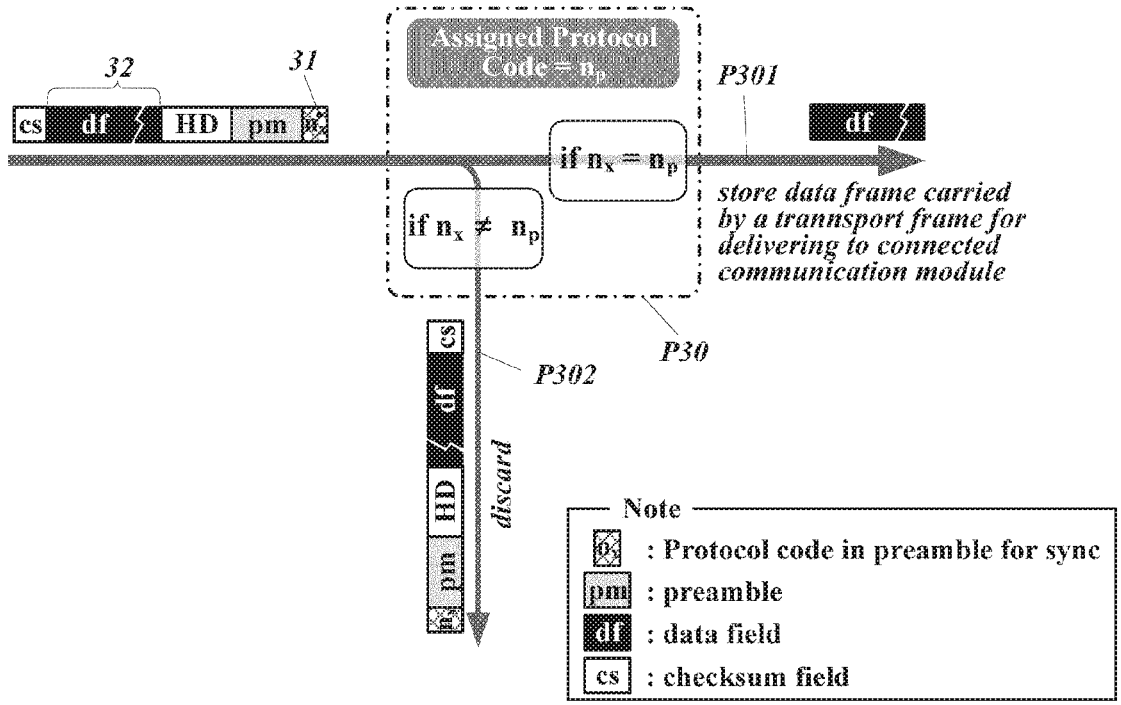
FIG. 3 is a diagram illustrating a process of selectively receiving only data of a transport frame transmitted from a CM communicating based on the same communication protocol on a bus according to an embodiment of the present invention.

While transmitting a transport frame stored in the internal transmission buffer to the bus as described above, the bus controller 11 selectively takes only data transmitted from nodes adopting the same communication protocol (i.e., other adapters, each being connected with a CM communicating based on the same communication protocol) with respect to data of transport frames transmitted by every adapter connected to the shared bus through a channel allocated to itself (or the moment no carrier is detected) in the same way as above. FIG. 3 conceptually illustrates this selective acquisition with respect to transport frames carried on the shared bus.

While distinguishing each channel according to a specific bit format defined by a time-divisional bus arbitration with respect to bits transmitted by the transceiver 13 according to signals detected from the shared bus, the bus controller 11 checks whether the bit pattern of the preamble, more specifically, the protocol code field starts in each channel. Of course, if the occupancy arbitration of the bus is a CSMA/CD system, it may be checked at any time whether the bit pattern of the protocol code field starts in the no signal state. For example, if the protocol code field is filled as illustrated in FIG. 2 (210), it is checked whether a bit value change from 0 to 1 is detected.

When the start of the protocol code field 31 is detected, the value $n_x$ of the protocol code field 31 is checked and the transport frame carried in each channel is filtered based on the identified value $n_x$ in order to determine whether or not to take it (P30). In other words, if a transport frame has a value in its protocol code field that is the same with the protocol code $n_p$ previously known by the bus controller 11, the bus controller 11 extracts the data 32 contained in the data field with reference to a value contained in the data size field within the header of the transport frame, and stores the extracted data, namely, a data frame constructed in compliance with an OCP in the internal receiving buffer (P301).

Extracting data from the data field 32 of the transport frame and storing it in the internal receiving buffer (P301), when a value of the protocol code field of the transport frame is confirmed to be identical to the assigned protocol code, are conducted in case that the assigned protocol code is for a different protocol type from the BCP. If the assigned protocol code (that is, the code for the communication protocol of the CM connected to the adapter) is a code for the BCP, and a value of the protocol code field of the transport frame is identical, the transport frame is stored in the internal receiving buffer without extracting data from the data field of the transport frame. This will be described in more detail later.

When the bus controller 11 finds that a value $n_x$ contained in the protocol code field 31 of the transport frame is not identical to the protocol code $n_p$ assigned thereto, it ignores the transport frame carried in the channel. (P302).

By the selective acquisition described above (a state in which selective acquisition from the bus is being conducted is referred to as a 'filtering mode'.), the resources are not used for receiving data, checking information of at least some data being received, or the like with respect to transport frames transmitted by other adapters to which heterogeneous CMs are connected.

The link interface 12 transmits the data frame, which is taken from the bus by the bus controller 11 and stored in the internal receiving buffer, to the CM $3_1$ according to a signaling method that conforms to the communication protocol of the connected CM $3_1$.

In the meantime, not all data frames transmitted from the master adapter 10 to the CM $3_1$ connected to the master adapter 10 may be intended to be received by the CM $3_1$. That is, although being delivered by the master adapter 10 since it is transmitted by the homogeneous CM, it may be destined for another homogeneous CM. In such a case, the CM $3_1$ ignores the received data frame from the master adapter 10 based on the destination address or identifier contained therein.

Selective data acquisition from the shard bus of the master adapter 10 as described above is conducted in the same manner by other slave adapters connected to the shared bus. Therefore, all the adapters directly connected to the bus receive data, using their communication resources, from only the channel (or of only the transport frame) carrying the data configured in compliance with the communication protocol set to themselves (that is, adopted by CMs connected to themselves).

By the above-described transmitting and receiving operations of the adapters 10 and $20_i$, even though CMs sharing the single bus as a communication path through the adapters 10 and $20_i$ adopt different communication protocols, only CMs of the same communication protocol communicate data with each other without causing a conflict with other communication protocols. This means that a single physical bus provides virtual dedicated communication paths as many as different communication protocols adopted by the connected CMs owing to the adapters 10 and $20_i$ connected to each of the CMs.

Figure 4:
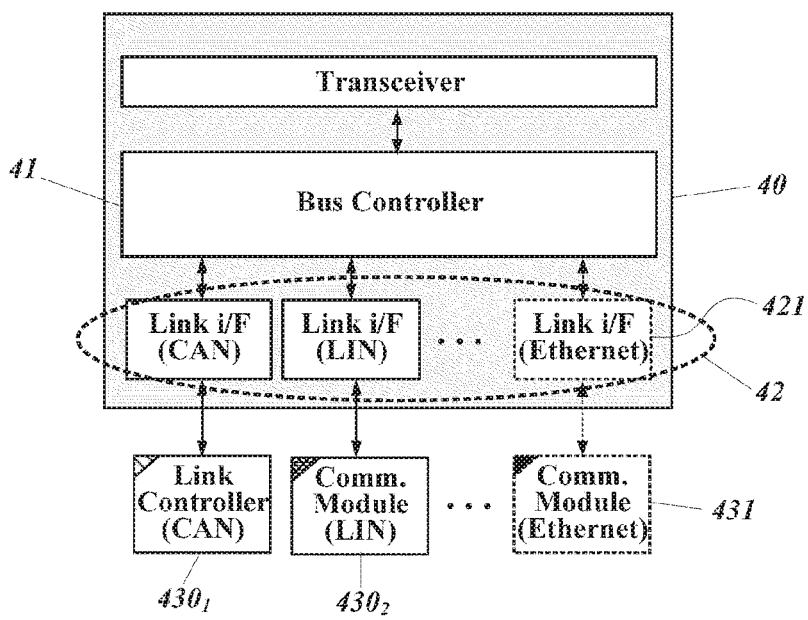
FIG. 4 illustrates a block diagram of an adapter that enables a plurality of CMs of different communication protocols to be connected together to a single bus according to another embodiment of the present invention.

In the above embodiment, each adapter is configured to be connected to a single CM. However, the present invention is not limited to such a configuration and may be configured such that a plurality of CMs are connected together. FIG. 4 illustrates a block diagram of an adapter configured according to the present embodiment and CMs connected thereto.

In the embodiment illustrated in FIG. 4, the adapter 40 includes a plurality of interfaces 42 for different communication protocols that conduct signal exchange and data transceiving according to an individually-designated communication protocol. In case that one adapter includes a plurality of link interfaces as described before, a link interface 421 to which a CM communicating based on the BCP can be connected may be included in the provided link interfaces according to an embodiment.

The bus controller 41 in the adapter 40 configured as shown in FIG. 4 (hereinafter, referred to as 'multi-adapter') knows beforehand the communication protocols, each of which is adopted by each of the plurality of link interfaces 42, through one of the above-described methods. Each link interface is to be connected with a CM communicating in compliance with a corresponding communication protocol. Of course, in some embodiments, some of the link interfaces embedded in the multi-adapter 40 may adopt the same communication protocol.

With respect to data frames received from the CMs $430_i$ (i=1, 2, . . . ) communicating in compliance with an OCP, i.e., not the BCP, and data frames to be transmitted to those CMs $430_i$, the bus controller 41 of the multi-adapter 40 conducts the conversion and transmission of a transport frame, and a selective acquisition of the transport frame from the shared bus, in the same manner as described above with reference to FIGS. 2 and 3. In case that a link interface 421 is embedded for connection with a CM communicating based on the BCP, namely, the bus-type Ethernet standard, and the CM 431 of the corresponding communication protocol is connected to the link interface 421, the bus controller 41 conducts the processing of transport frames for the CM 431 differently from the above.

In case that the CM 431 communicating based on the BCP (hereinafter, the CM communicating based on the BCP is abbreviated as a Bus-Matching Communication Module (BMCM).) is connected indirectly to the shared bus via the multi-adapter 40, the aforementioned dip switches of all the adapters (including a multi-adapter, if any) are set to a value indicating 'composite mode'. Thus, when each adapter converts a data frame received from a connected CM into a transport frame, it converts to a transport frame to include a checksum field.

In the event that the BMCM 431 is connected to the multi-adapter 40, the bus controller 41 uses a data frame, which is a data block transmitted from the BMCM 431 and stored in an internal transmission buffer by the link interface 421, as a transport frame as it is and transmits it to the shared bus via a transceiver the moment a channel allotted to the multi-adapter 40 begins on the bus (or at any time when no carrier is detected from the bus). This is because the format of the data frame received from the BMCM 431 conforms to the BCP, so that no additional format conversion is necessary.

According to a signal transceiving method between the BMCM 431 and the link interface 421, the bus controller 41 may place a preamble, which meets the requirements of the BCP, at the head of the data frame received from the BMCM 431 and then stored.

Since the preamble placed at the head of the data frame received from the BMCM 431, or the preamble placed ahead the received data frame by the bus controller 41 satisfies the requirements of the BCP, a bit string corresponding to the protocol code field is "1010", for example, that is distinguished from the preamble in the case of an OCP where a bit string starting with a bit pair of "11" is used (210).

Therefore, the bus controller of each adapter (including a multi-adapter) connected to the shared bus is capable of distinguishing, from a value of the protocol code field of the preamble for a transport frame being currently carried on the bus, what protocol (including the BCP) a data frame incorporated into the transport frame is based on.

Figure 5:
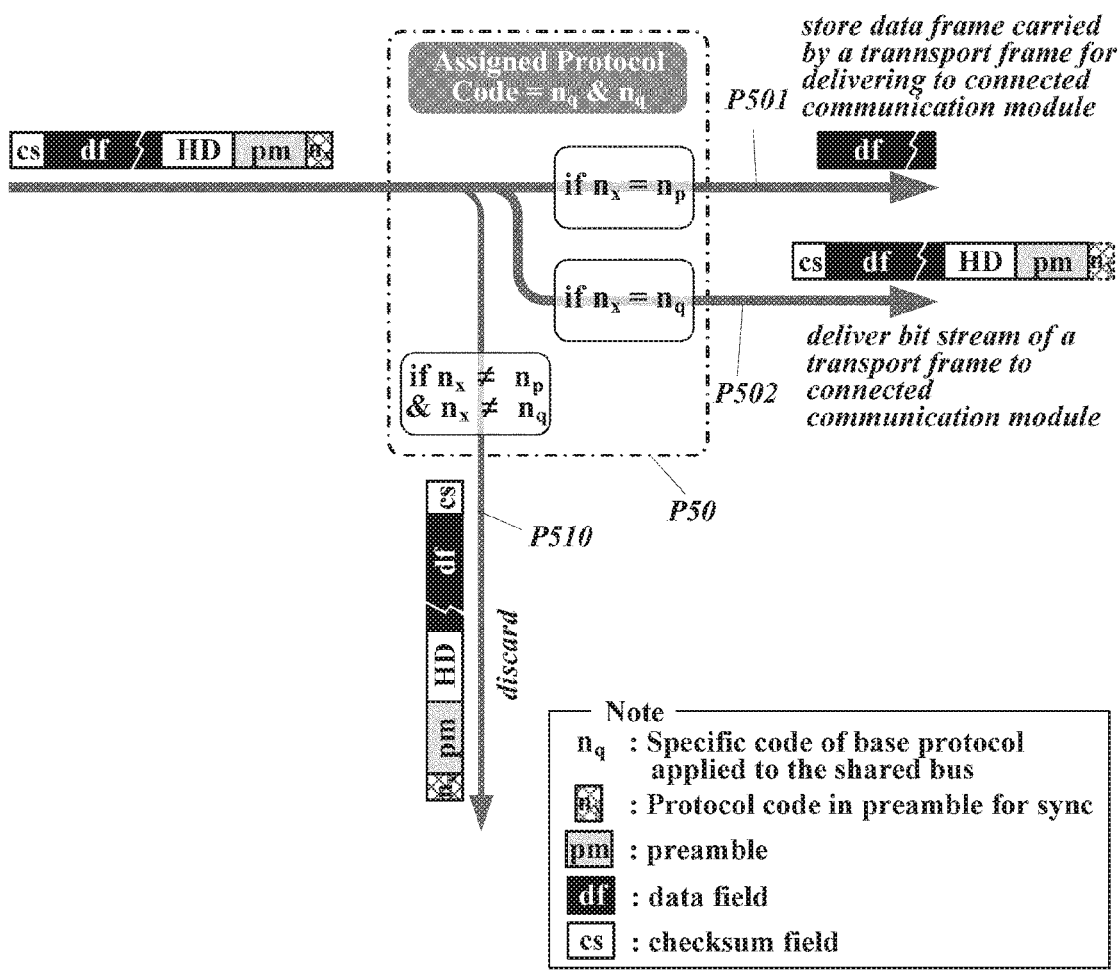
FIG. 5 shows a diagram schematically illustrating a process of selectively receiving a transport frame carried on a bus in case a CM of a particular communication protocol is also connected to the adapter configured as illustrated in FIG. 4, according to an embodiment of the present invention.

On the other hand, in case a plurality of heterogeneous CMs including the BMCM 431 are connected to the multi-adapter 40, the bus controller 41 selectively receives the transport frames carried on the bus that are related to the communication protocols on which the connected CMs $430_i$ and 431 are individually based. FIG. 5 conceptually illustrates a selective acquisition (P50) in this filtering mode.

The bus controller 41 conducts selective acquisition in the same manner as described above (P501) with respect to a transport frame of which the protocol code field contains a value identical to any one of the OCPs among the plurality of protocol codes $n_p$, $n_q$, and so forth that are already recognized (P501). However, when a value of the protocol code field of a transport frame indicates a protocol code for the BCP, not the OCP, the entire transport frame is transferred to the BMCM 431 connected through the corresponding link interface 421 without the process of extracting only the data from the data field of the transport frame (P502). To be sure, depending on the signal transceiving method applied between the link interface 421 and the BMCM 431, the preamble may be removed from the received transport frame and then delivered to the BMCM. In addition, data of a transport frame may be temporarily stored in an internal receiving buffer and then retrieved by the link interface 421 to be delivered according to an embodiment.

And, if a transport frame appearing on the shared bus carries, in its protocol code field, a value identical to none of the already-known plurality of protocol codes $n_p$, $n_q$, and so on, the transport frame is ignored so that no resource is occupied for data reception (P510).

In order to allow only the link interface, which conducts data processing according to the same communication protocol, to read and then transmit to the connected external CM, the data storing of the bus controller 41 into the internal receiving buffer is done in accordance with the promised manner (for example, use of separate storage spaces, each being allocated for each protocol) between the bus controller and the link interfaces.

In one embodiment according to the present invention, in the case of a multi-adapter configured to connect a plurality of heterogeneous CMs $430_i$ and 431 as illustrated in FIG. 4, the bus controller 41 of the multi-adapter may assign a priority to the communication protocols of the CMs connected individually via the link interfaces 42. The assigned priority may then be applied to the transmission of data frames, received through each link interface, to the shared bus.

This will be described in more detail. The bus controller 41 transmits, through the transceiver to the shared bus, a transport frame carrying a data frame configured depending on the communication protocol with the highest assigned priority among the transport frames, which are converted by each link interface 42 after being received (or which is the same as received due to no conversion), stored in the internal transmission buffer, when it can occupy the shared bus in the order of the channels going on. And, the bus controller 41 determines whether or not to transmit a transport frame carrying a data frame configured in compliance with the communication protocol, which the next priority is assigned to, when it can occupy the bus next time in the order of the channels. For example, if priority is assigned in the order of CAN, LIN, and Ethernet for the communication protocols of the connected CMs, when a transport frame carrying a data frame of the CAN protocol is stored in the internal transmission buffer, that transport frame is selected to be sent. If there is no transport frame carrying a data frame of the CAN protocol, another transport frame including a data frame of the LIN protocol, which the next priority is assigned to, is transmitted to the bus. Of course, if there is no transport frame carrying a data frame of the LIN protocol, another transport frame including a data frame of the Ethernet protocol would be transmitted to the bus.

If an arbitrary adapter is able to transmit multiple transport frames in succession when it can occupy the shared bus depending on the order of channels, the priority assigned for each communication protocol can be applied to determine the order of transport frames to be sent in series to the bus. For example, when the bus can be used in the order of channels, after all transport frames for data frames of communication protocol, which the highest priority is assigned to, stored in the internal transmission buffer at present are transmitted to the shared bus in the order as they are received, transport frames for data frames of a communication protocol, which the next priority is assigned to, are transmitted subsequently. Of course, when the bus can be used, the above-explained data transmission based on the priority assigned to each of communication protocols is performed on the transport frames only up to a time or data size that can be allowed for one-time access to the bus, and transmission of the remaining transport frames stored in the internal transmission buffer is suspended until the next access to the bus is available.

Figure 6:
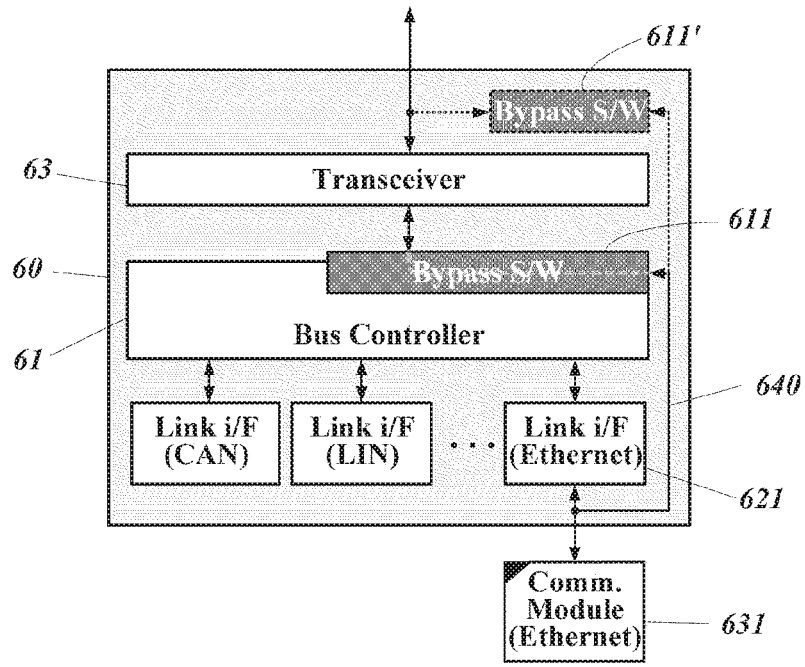
FIG. 6 shows a block diagram of the adapter, illustrated in FIG. 4, to be configured to selectively provide a bypass path that makes a CM of a particular communication protocol equivalent to being directly connected to a bus.

In one embodiment according to the present invention, a bypass mode can be set in the case of a multi-adapter. The bypass mode may be set through a component such as a dip switch embedded in the multi-adapter as mentioned above. FIG. 6 illustrates a block diagram of a multi-adapter 60 capable of performing an operation of the bypass mode according to the present embodiment.

The dip switch for setting the bypass mode may be set by a worker or the like who builds a bus system as illustrated in FIG. 1 in an apparatus. As illustrated in FIG. 6, the bypass mode can be set in the case that the BMCM 631 is connected to only the link interface 621 conducting data transceiving according to the BCP among the plurality of link interfaces provided in the multi-adapter 60. The dip switch not set to the bypass mode indicates the filtering mode. In this filtering mode, the selective acquisition operation (P50) for transport frames depending on a value of the protocol code field is conducted as described above with reference to FIG. 5.

If the bypass mode is set, the bus controller 61 of the multi-adapter 60 activates an internal switch 611 to establish a signal path 640, which connects a BMCM 631 to the transceiver 63 directly, instead of using normal path for data transceiving through a provided link interface. According to an embodiment, an internal switch 611' may be embedded therein so that the signal path 640 directly connecting between the BMCM 631 and the signal line of the shared bus can be optionally made without passing through a link interface. In this embodiment, the internal switch 611' is activated to set up the direct path 640 when the bypass mode is set.

When the multi-adapter 60 configured as shown in FIG. 6 is set to the bypass mode, all signals carried on the shared bus are transferred directly to the BMCM 631 connected to the multi-adapter 60. The signals transmitted by the BMCM 631 appear directly on the shared bus, too.

Figure 7:
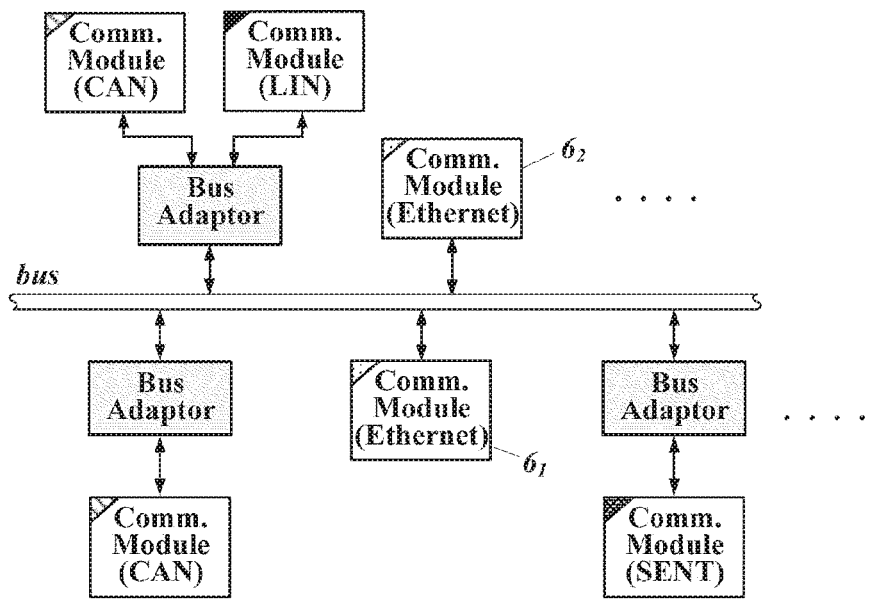
FIG. 7 is a diagram of a bus system in which CMs of different communication protocols are indirectly connected through an adapter, and CMs of a particular communication protocol are directly connected to a single shared bus according to an embodiment of the present invention.

In the event that the multi-adapter 60 to which the BMCM is connected is set to the bypass mode as described before, the communication environment including the multi-adapter 60 having such a configuration is exactly the same as the communication environment where the BMCMs $6_i$ (i=1, 2, ...) are directed connected to the shared bus to which the adapters (including a multi-adapter. in the following, the term of 'adapter' is used to mean a multi-adapter as well unless otherwise specified.) are connected as shown in FIG. 7.

In a communication environment in which there is a BMCM connected to a multi-adapter set to the bypass mode or a BMCM $6_i$ directly connected to the shared bus, such a BMCM receives all transport frames carried on the bus, unlike the adapters, because it does not perform a selective acquisition depending on a value of the protocol code field with respect to transport frames being carried on the shared bus.

However, some of transport frames thus received may not be naturally intended for the BMCMs. Therefore, if the received transport frames were transmitted by the adapter from a heterogeneous CM, the attempt to decode them or the processing data of the data field obtained by decoding might cause unexpected failures.

For this reason, in one embodiment according to the present invention, the bus controller of the adapters 10, $20_i$, 40 and 60 is configured to support a special mode (this is called 'mixed mode' hereinafter) in order to support the connection of an adapter to a BMCM in the bypass mode, and/or the direct connection of the BMCM 6, to the shared bus as shown in FIG. 7.

In one embodiment according to the present invention, the mixed mode may be a default mode. That is, without supporting artificial setting of the mode through a component such as a dip switch, each adapter may be fixed in the mixed mode.

Figure 8A:
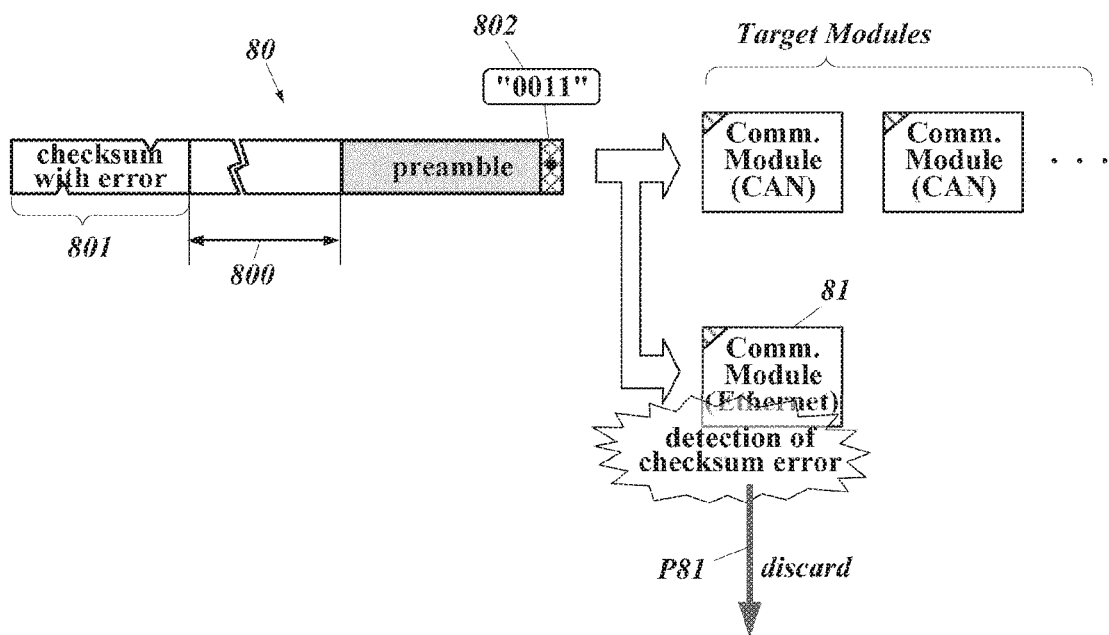
FIGS. 8A and 8B schematically illustrate examples of distinguishing two cases, one case of preventing CMs of a particular communication protocol connected directly to a bus from receiving, and the other case of allowing only those modules to receive, by whether or not there is an error in the checksum field added to an arbitrary transport frame when transmitting the transport frame to the bus according to an embodiments of the present invention.

In the mixed mode, when converting an arbitrary data frame configured depending on an OCP, which is to be stored in the transmission buffer, into a transport frame as described above, the bus controller of each adapter creates an erroneous checksum for the part of data, for example, data from header to data field 800 to be incorporated into the transport frame 80, and inserts it into the checksum field 801 of the corresponding transport frame 80, as illustrated in FIG. 8A, in order for an recipient of the transport frame 80 to recognize that data carried in the transport frame 80 is in error. For example, a checksum obtained by inverting an arbitrary one bit within a checksum generated normally without any error is inserted in the checksum field 801.

If the transport frame 80 including a checksum field 801 filled with a bit string, as explained before, that causes the error verifying process of a recipient to detect an error in the received frame is transmitted over the shared bus to the adapters connected to that bus, each adapter in the filtering mode determines whether to take the transport frame 80 on the basis of the value 802 written in the protocol code field placed at the head of the transport frame. Being determined to receive, a data frame carried in the data field is extracted irrespective of the checksum field, and then it is normally delivered to a CM communicating based on an OCP that is intended for receiving the transport frame.

Meanwhile, since the BMCM 81 connected to the shared bus indirectly via an adapter set in the bypass mode or directly connected to the shared bus receives all transport frames without the above-explained selective acquisition from the bus, it receives the transport frame 80 regardless of the value 802 written in the protocol code field indicating that it is one of OCPs. However, the BMCM 81 determines that the received transport frame is damaged in the error verifying process for the received transport frame and discards it (P81), because the value in the checksum field of the transport frame is detected to be in error.

Accordingly, data extraction from each field and processing of the extracted data with respect to the transport frame, which would be performed after the error verifying process if the received transport frame was in no error, do not proceed. Thus, a failure or the like to be caused by the BMCM receiving the transport frame transmitted toward the heterogeneous CMs never occurs.

In conclusion, the transport frame intended only for reception of CMs communicating based on one of the OCPs is not received by the BMCM 81 connected indirectly via the adapter, which is set to the bypass mode, or directly to the shared bus, but is received by only CMs communicating based on said one of the OCPs are received.

Figure 8B:
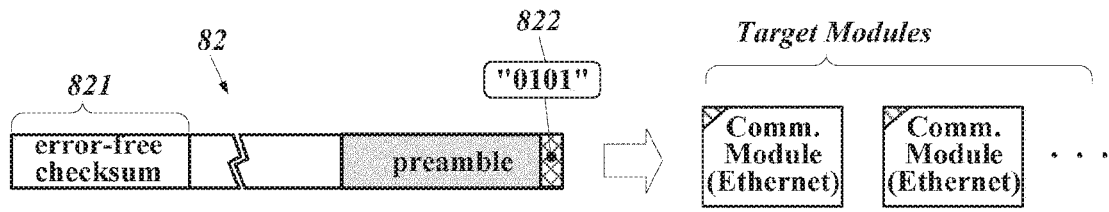

On the other hand, when transmitting a data frame, the BMCM connected directly to the bus or indirectly through an adapter (connected via an adapter set to the bypass mode or the filtering mode) always inserts correct value 821 in the checksum field to be append to the end of the frame as illustrated in FIG. 8B. The transport frame 82 to which the error-free checksum field is added is normally received by the same type of CMs, that is, the BMCMs, so that the data corresponding to the received frame is properly processed without any problem.

Since the transport frame 82 configured as shown in FIG. 8B and transmitted to the share bus has a value 822, which is different from those of other OCPs, of the protocol code field within the preamble, the adapters operating in the filtering mode discard the transport frame 80 without taking it from the bus depending on the value 822 of the protocol code, if any one of CMs connected thereto are not based on the BCP.

In another embodiment according to the present invention, a transport frame, which is to be transmitted toward CMs communicating based on any one of the OCPs, can be ignored by the BMCMs in a manner other than adding an erroneous checksum as explained before. In this embodiment, an address that is intended not to be received by any BMCM connected to the bus is used for the destination address of a transport frame. That address is referred to as 'void address' hereinafter. The void address is an address that cannot be or has not been assigned to any BMCM and at the same time is not recognized as a broadcast frame in the BCP.

If the standard protocol of bus-type Ethernet is assumed as the BCP, the address applied to the layer for transmitting and receiving a transport frame is now composed of a 3-byte OUI (Organizationally Unique Identifier) and a 3-byte serial number assigned by a manufacturer. Therefore, if an identifier, for example, CC: CC: CC or DD: DD: DD, etc. that is not assigned yet to any manufacturer with respect to the part of the 3-byte OUI is used as a forepart to form a 6-byte void address with an arbitrary 3-byte value, none of the BMCMs connected directly or indirectly to the shared bus can be the destination for a transport frame with that void address.

In addition, when selecting a void address that cannot be assigned or has not been assigned to any BMCM, a special address (for example, FF: FF: FF: FF: FF: FF) that designates a broadcast is also excluded because the special address specifies that every BMCM is to receive a corresponding transport frame regardless of its destination address.

Therefore, in the present embodiment, when the bus controller of each adapter makes a data frame, which is received from a CM communicating based on any one of the OCPs, into a transport frame and then transmits the transport frame toward the homogeneous CMs, the destination address field of the header is filled with a void address selected as above. Then, the BMCM connected to the adapter set in bypass mode or directly connected to the shared bus will discard the transport frame without receiving it.

In this embodiment, the adapter may be equipped with a dip switch that allows a worker or the like who builds the bus system to set an arbitrary value (for example, one of '00' to 'FF') with respect to one byte of the OUI part of the selected void address that is to be filled in the destination address field. The bus controller of each adapter then reads the value of the dip switch and uses it as a single byte defined for the OUI. In this way, if the void address to be used as the destination address can be variably set, it is possible to prepare for possible conflict of the selected void address with an address assigned to another BMCM to be produced in the future.

In one embodiment according to the present invention, the method of filling the destination address with the selected void address and the method of adding an erroneous checksum field to a transport frame may be applied in combination with each other with regard to a transport frame for carrying a data frame received from a CM communicating based on any one of the OCPs.

In the description of the various embodiments up to now, it is assumed that the shared bus to which the adapters are connected is a wired bus made of physical signal lines. However, the present invention can naturally be applied not only to a wired bus but also to a bus using a wireless communication path that enables wireless communication between only a limited plurality of nodes using pre-specified frequency band.

Unless the various embodiments, for the method for enabling nodes of heterogeneous communication protocols to share a single bus by adapting to one of the heterogeneous communication protocols, described so far are incompatible with each other, the explained embodiments can be properly chosen in various ways and then combined to embody the concept and idea of the present invention.

The embodiments of the present invention described above have been introduced for the purpose of illustration; therefore, it should be understood by those skilled in the art that modification, change, substitution, or addition to the embodiments is possible without departing from the technical principles and scope of the present invention defined by the appended claims.

What is claimed is:

1. A device for transmitting and receiving data to/from other devices through a shared bus, the device comprising:
   a transceiver configured to detect signals carried on the bus and to transmit input data after converting the input data into a signal form suitable for the bus;
   a first interface configured to transmit and receive to/from a Communication Module (CM) that is electrically connected to the first interface and is intended for transceiving data based on an arbitrary Communication Protocol (CP);
   at least one second interface configured to transmit and receive to/from at least one CM that is electrically connected to said at least one second interface respectively and is intended for transceiving data based on another CP other than the arbitrary CP; and
   a controller configured
      to incorporate a data block in form of data frame into a frame of a specific format in which a bit block for data synchronization is placed at head, the data block being received from the CM through the first interface, and
      to transmit the frame of the specific format to the bus, and to recognize a series of frames of the specific format from signals on the bus detected by the transceiver, and to take only a data block constituted in compliance with the arbitrary CP from the series of frames,
   wherein the controller is further configured
      to insert a code indicating the arbitrary CP into a specific part of the bit block when transmitting data to the bus,
      to take data of a certain frame if a signal corresponding to the specific part of a bit block, detected by the transceiver from the bus, pertaining to the certain frame is identified as the code indicating the arbitrary CP,
      to deliver a data block within a data field of the taken frame to the CM through the first interface, and
      to ignore the certain frame without receiving it from the bus if the signal corresponding to the specific part is not identified as the code indicating the arbitrary CP, and
   wherein the controller is further configured:
      to insert a code indicating a CP, which one interface among a plurality of interfaces consisting of the first interface is based on for transceiving data, into the specific part of the bit block placed at a front of a second frame of the specific format when incorporating a data block received from the one interface into the second frame;
      to take, from the bus, data of a third frame with a certain code that is confirmed to be identical to one of codes respectively indicating CPs which the plurality of interfaces are based on for transceiving data, the certain code being detected by the transceiver from a signal corresponding to the specific part of a bit block being carried on the bus; and to deliver all or part of data of the taken third frame to a CM intended to transceive data based on a CP corresponding to the certain code.

2. The device of claim 1, wherein the controller is configured to add an error verification field, which a bit string is filled in for checking a transmission error, to a back end of the received data block when constituting the received data block into a frame of the specific format, the bit string being to cause data in the constituted frame to be detected as faulty.

3. The device of claim 2, wherein the controller is configured not to add the error verification field to a back end of the received data block when constituting the received data block into a frame of the specific format, if a special mode is set.

4. The device of claim 1, wherein the controller is configured to add a header including a destination address and a source address to a front end of the received data block when constituting the received data block into a frame of the specific format, the destination address being a specific address that a particular type of CMs will not receive, and wherein the particular type of CMs are intended to transmit and receive data in compliance with a CP to be observed for transmitting and receiving data through the bus.

5. The device of claim 4, wherein the specific address is an address that cannot be or has not been assigned to the particular type of CMs and is not a special address indicating a frame for broadcast, either.

6. The device of claim 1, wherein an arbitrary one interface among the plurality of interfaces is configured to be connected to and communicate data with a CM that is intended to transmit and receive data in same CP as a CP to be observed for transmitting and receiving data through the bus.

7. The device of claim 6, wherein the controller is further configured:
to cause a data block received from the arbitrary one interface to be a frame of the specific format as it is; and
to convert a data block, received from an interface other than the arbitrary one interface, to a frame of the specific format by adding a header including an address field of a destination and a source to a front end, adding an error verification field in which a bit string to cause detection of transmission error is inserted, and placing the bit block at a front end of the added header.

8. The device of claim 6, wherein the controller is further configured to:
to cause the arbitrary one interface to transmit the taken third frame, as it is, to a CM connected through the arbitrary one interface if the certain code indicates a CP which the arbitrary one interface is based on for transceiving data; and
to cause another interface other than the arbitrary one interface to transmit a data block extracted from a data field of the taken third frame to a CM connected through the another interface if the certain code indicates a CP which the another interface is based on for transceiving data.

9. The device of claim 6, wherein the controller is further configured to establish a path that enables a CM connected to the arbitrary one interface to be directly connected to the transceiver or the bus if a special mode is set.

10. The device of claim 1, wherein the controller is further configured:
to assign a priority to each CP which the plurality of interfaces are respectively based on for transceiving data;
to select data blocks received from the plurality of interfaces according to priorities assigned to CPs applied to the data blocks and to convert the selected data blocks into one or more frames of the specific format; and
to transmit each of the converted frames of the specific format to the bus through the transceiver.

11. The device of claim 10, wherein the controller is further configured:
to convert only data blocks, which a highest priority CP is applied, among the received data blocks into a frame of the specific format; or
to convert data blocks among the received data blocks into a frame of the specific format in such a manner that one or more data blocks to which the highest priority CP is applied are included in a most advanced position in a frame of the specific format.

12. The device of claim 1, wherein the code indicating the arbitrary CP consists of a bit string that is different, by at least one bit, from another bit string corresponding to the specific part within a bit pattern that is defined for the bit block by a CP to be observed for transmitting and receiving data through the bus.

13. The device of claim 1, wherein the specific part corresponds to a front part of the bit block.

14. A method for transmitting data to and receiving data from other devices through a shared bus, the method comprising:
a transmitting step of receiving a data block of a series of bits from a Communication Module (CM) among a plurality of connected CMs that are intended for transceiving data based on mutually-different Communication Protocols (CPs), respectively, and transmitting the received data block to the bus, the data block being formed in a data frame format; and
a receiving step of detecting signals carried on the bus and selectively transferring data corresponding to the detected signals to one of the plurality of CMs,
wherein the transmitting step comprises
a step of receiving the data block from the CM,
a step of inserting a specific code allocated for an arbitrary CP, which data transceiving of the CM is based on, among specific codes respectively allocated for the mutually-different CPs, into a specific part of a bit block for data synchronization when incorporating the received data block into a frame of a specific format in which the bit block is placed at a head, and
a step of transmitting the frame of the specific format to the bus, and
wherein the receiving step comprises
a step of detecting signals on the bus,
a step of checking whether, among the detected signals, a signal corresponding to the specific part of the bit block placed at a head of a frame of the specific format indicates one of the specific codes,
a step of taking a certain frame, of which the bit block placed at a head is carrying the specific code, if the signal corresponding to the specific part is identified as one of the specific codes, and transferring a data block within a data field of the taken certain frame, or of ignoring signals following the bit block without receiving them from the bus if the signal corresponding to the specific part is not identified as either of the specific codes, and
a step of delivering all or part of data of the taken certain frame to one CM among the connected CMs that is intended to transceive data based on a CP to which the one specific code is allocated.

* * * * *